US008990289B2

(12) United States Patent
Mott et al.

(10) Patent No.: US 8,990,289 B2
(45) Date of Patent: Mar. 24, 2015

(54) SERVER BASED FRAMEWORK FOR IMPROVING AJAX PERFORMANCE

(75) Inventors: Carla Mott, Mountain View, CA (US); Gregory Murray, Campbell, CA (US)

(73) Assignee: Oracle America, Inc., Redwood City, CA (US)

( * ) Notice: Subject to any disclaimer, the term of this patent is extended or adjusted under 35 U.S.C. 154(b) by 197 days.

(21) Appl. No.: 12/395,253

(22) Filed: Feb. 27, 2009

(65) Prior Publication Data

US 2010/0223322 A1 Sep. 2, 2010

(51) Int. Cl.
*G06F 15/16* (2006.01)
*G06F 17/30* (2006.01)
*H04L 29/08* (2006.01)

(52) U.S. Cl.
CPC .......... *G06F 17/30905* (2013.01); *H04L 67/02* (2013.01); *H04L 67/34* (2013.01)
USPC ........................................................ 709/203

(58) Field of Classification Search
USPC ........................................................ 709/203
See application file for complete search history.

(56) References Cited

U.S. PATENT DOCUMENTS

| | | | |
|---|---|---|---|
| 6,973,626 B1* | 12/2005 | Lahti et al. | 715/763 |
| 7,155,493 B1* | 12/2006 | Weber | 709/218 |
| 7,389,495 B2 | 6/2008 | Wang et al. | |
| 7,409,439 B2 | 8/2008 | Raja et al. | |
| 7,409,710 B1 | 8/2008 | Uchil et al. | |
| 7,451,393 B1 | 11/2008 | Herbison et al. | |
| 7,454,498 B2 | 11/2008 | Shuster | |
| 7,454,745 B2 | 11/2008 | Aridor et al. | |
| 7,454,755 B2 | 11/2008 | Jacobs et al. | |
| 7,454,759 B2 | 11/2008 | Mukundan et al. | |
| 7,490,141 B1 | 2/2009 | Cammarata et al. | |
| 7,664,956 B2* | 2/2010 | Goodman | 713/176 |
| 7,937,478 B2* | 5/2011 | Cheng et al. | 709/227 |
| 2003/0009672 A1* | 1/2003 | Goodman | 713/176 |
| 2003/0110151 A1* | 6/2003 | Fortier | 707/1 |
| 2007/0136443 A1 | 6/2007 | Sah et al. | |
| 2007/0180099 A1* | 8/2007 | Tsimelzon et al. | 709/223 |
| 2007/0298773 A1* | 12/2007 | Uematsu et al. | 455/414.2 |
| 2008/0077982 A1 | 3/2008 | Hayler et al. | |
| 2008/0098301 A1 | 4/2008 | Black et al. | |
| 2008/0281798 A1 | 11/2008 | Chatterjee et al. | |

(Continued)

OTHER PUBLICATIONS

Wickessor, jMaki Ajax Framework Releases 1.0 with Support for Java, PHP, and Ruby, Sep. 25, 2007, infoq.com, 2 pages.*

(Continued)

*Primary Examiner* — Richard G Keehn
(74) *Attorney, Agent, or Firm* — Polsinelli PC

(57) ABSTRACT

A system for rendering a web page is disclosed. The system comprises a server adapted to communicate with a client. The client operates a browser in communication with the server and is arranged to render material to the browser that an end user may view on the web page. The system also includes a dynamic code set having configuration parameters for use in rendering the web page, wherein the configuration parameters are formed of a first configuration parameter including at least one of combined resources, strategically placed resource tags, headers set to ensure cacheable resources, a GZip file, and minified resources, and a second configuration parameter including at least one of combined resources, strategically placed resource tags, headers set to ensure cacheable resources, a GZip file, and minified resources. A method of creating a web application is disclosed. A machine readable medium is also disclosed.

19 Claims, 12 Drawing Sheets

(56) References Cited

U.S. PATENT DOCUMENTS

2008/0298342 A1 12/2008 Appleton et al.
2009/0234972 A1 9/2009 Raghu et al.

OTHER PUBLICATIONS

Ajaxian.com, Resource Accelerate: Caching and Compression, Jun. 13, 2007, ajaxian.com, 4 pages.*

Arun Gupta, Dynamic Data in jMaki Widgets Using JPA, Jun. 22, 2007, 21 pages.*

TechKnow, Using jMaki in a Visual Development Environment, May 28, 2007, 2 pages.*

Author Unknown, "Project jMaki", https://ajax.dev.java.net, 3 pages, May 3, 2008.

Garrett, Jesse James, "Ajax: A New Approach to Web Applications", http://www.adaptivepath.com/ideas/essays/archives/000385.php, 5 pages, Feb. 18, 2005.

Murray et al., "Restricting Access to Ajax Services", http://java.sun.com/developer/technicalArticles/J2EE/usingapikeys/index.html, 5 pages, Sep. 2007.

Ort et al., "Mashup Styles, Part 1: Server-Side Mashups", http://java.sun.com/developer/technicalArticles/J2EE/mashup_1/, 10 pages, May 2007.

Stamos et al., "Attacking AJAX Web Applications", Information Security Partners, LLC, pp. 1-73, Aug. 3, 2006.

Sureau, Denis, "Ajax Tutorial (Asynchronous Javascript and XML)", http://www.xul.fr/en-xml-ajax.html, 7 pages, 2006.

Author Unknown, "Best Practices for Speeding Up Your Web Site," http://developer.yahoo.com/performance/rules.html, 11 pages, at least as early as Nov. 21, 2008.

Author Unknown, "Exceptional Performance," http://developer.yahoo.com/performance/, 2 pages, at least as early as Nov. 21, 2008.

Author Unknown, 2008. "jMaki," http://jmaki.com/, 3 pages, at least as early as Oct. 7, 2008.

Author Unknown, "jMaki Ajax Performance Enhancer," https://ajax.dev.java.net/performance.html, 3 pages, at least as early as Jun. 10, 2008.

Mott, Carla, "Enabling performance feature in jMaki," http://weblogs.java.net/blog/carlavmott/archive/2008/10/enabling_perfor.html, 4 pages, Oct. 22, 2008.

Non-Final Office Action, U.S. Appl. No. 12/239,950, Jan. 7, 2011.
Amendment and Response to Non-Final Office Action, U.S. Appl. No. 12/239,950, Apr. 7, 2011.
Final Office Action, U.S. Appl. No. 12/239,950, May 27, 2011.
Amendment and Response to Final Office Action, U.S. Appl. No. 12/239,950, Jul. 26, 2011.
Advisory Action, U.S. Appl. No. 12/239,950, Aug. 2, 2011.
Appeal Brief, U.S. Appl. No. 12/239,950, Oct. 26, 2011.
Examiner's Answer, U.S. Appl. No. 12/239,950, Nov. 18, 2011.
Reply Brief, U.S. Appl. No. 12/239,950, Jan. 18, 2012.

* cited by examiner

| Configuration Parameters | Activation |
|---|---|
| Combined Resources | true/false |
| Set Header to Cache Resources | true/false |
| Store Script & Stylized | true/false |
| Minified Resources | true/false |
| GZip Contents | true/false |

| Property | Description | Default |
|---|---|---|
| combineScripts | Combine all JavaScript resources | false |
| combinestyles | Combine all CSS resources | false |
| combineResourcesMaxAge | Max age to keep content in seconds | 345,600 |
| useMinimizedJS | Use minfied JavaScript | false |

FIG. 11

| Property | Description | Default |
|---|---|---|
| jmaki-combined-resources-service | URL maping to the dynamic code set that renders the cached content | /cache |
| jmaki-combinescripts | Combine all JavaScript resources | false |
| jmaki-combinestyles | Combine all CSS resources | false |
| jmaki-combined-resources-maxage | Max age to keep content in seconds | 345,600 |
| jmaki-useminified | Use minified JavaScript | true |

FIG. 12

SERVER BASED FRAMEWORK FOR IMPROVING AJAX PERFORMANCE

FIELD OF THE INVENTION

The present invention relates to Internet or web based applications and in particular to systems for web page rendering.

BACKGROUND

As is known, a web browser communicates with a server. The web browser may submit a request to a server for a web page, information or application. The server serves a response to the browser. Thus, in a basic web page request/response arrangement, a browser sends a request to a web server and in exchange receives a web page. Each new request results in a new web page. Unfortunately, oftentimes 80-90% of end-user response time is spent downloading all the components in a web page.

Typical conventional web applications display output content via a screen output page file such as a Java Server Page (JSP). Such an application contains a JSP for each web page in the application, and stores each JSP in a separate file. An application may contain many JSP files corresponding to each screen. A typical JSP contains many lines of HTML code for displaying, or rendering screen output.

The web page can further operate with, for example, JavaScript. When using JavaScript, a new request may be made to the server. In this case, rather than a new web page, new data is provided in response. The data is presented in the same web page, i.e., the content of the web page may change. In other words, the web page is not reloaded on the user's system. These types of requests are commonly termed "Ajax" requests. Using Ajax components on a web page improves many aspects of web page performance, but web page performance can still be perceived as slow as the pages load resources over a network and as a page is rendered by a browser.

jMaki, is a client/server framework for creating Ajax applications and markups and provides many rich features for jMaki's web pages used to rapidly create Ajax applications but these applications can exacerbate performance issues. To fully support Ajax applications, jMaki includes many Cascading Style Sheet (CSS) and JavaScript resources which can increase the number of Hyper Text Transfer Protocol (HTTP) requests and slow down the initial load of a page, slowing network performance. In addition, in a traditional web page, JavaScript or CSS code may exist in several files. Thus, in the code for a web page, a reference to each of those several files exists. As a result, in translating the code, each time the browser encounters that JavaScript or CSS reference, it goes to the appropriate file and retrieves the code. Further, the contents of CSS and JavaScript can be large and require a lot of bandwidth to transfer to a client. Moreover, subsequent calls from a browser for resources can often result in the resources being re-sent to the browser.

As is known, an Internet browser operates and accomplishes tasks in a particular order. For example, when a browser encounters coding such as JavaScript, it stops everything else and loads the JavaScript. Further, using Ajax components in a web page can slow the performance of a web page as it loads resources over the network and as a page is rendered by the browser. Page rendering in many if not all modern browsers will also stop as JavaScript and CSS resources are loaded over a network, causing a page or pages to render slower. While some of this slowness may be perceived slowness by an end user, it can often lead to frustration of the user.

To date, the only available solution for solving these issues is written guidelines and recommendations which must be employed by a skilled programmer in order to improve performance. Moreover, each guideline or recommendation is applied individually; in other words they are not all applied at once. Web application development typically employs specialized toolkits, applications and languages. Efficient development of conventional web applications suggests extensive and thorough knowledge of web page delivery technologies such as HTML, XML, JavaScript, Java, CSS Servlets, JSPs and others. To this end, the developer must be familiar with the guidelines and procedures, as well as how the web server and web applications work. The developer must then be able to apply the guidelines and recommendations on a case by case basis in a manner that generates the appropriate result.

Accordingly, a server based framework is provided to improve both network performance and browser loading of Ajax based applications.

SUMMARY

A system for rendering a web page is provided. The system comprises a server adapted to communicate with a client. The client operates a browser in communication with the server and is arranged to render material to the browser that an end user may view on the web page. The system also includes a dynamic code set having configuration parameters for use in rendering the web page, wherein the configuration parameters are formed of a first configuration parameter including at least one of combined resources, strategically placed resource tags, headers set to ensure cacheable resources, a GZip file, and minified resources, and a second configuration parameter including at least one of combined resources, strategically placed resource tags, headers set to ensure cacheable resources, a GZip file, and minified resources.

A method comprising creating a web application for rendering a web page is provided. The application has a client side and a server side. The method includes setting a plurality of predetermined configuration parameters in a dynamic code set having configuration parameters for use in rendering the web page. The configuration parameters are formed of a first configuration parameter including at least one of combined resources, strategically placed resource tags, headers set to ensure cacheable resources, a GZip file, and minified resources, and a second configuration parameter including at least one of combined resources, strategically placed resource tags, headers set to ensure cacheable resources, a GZip file, and minified resources. The method further includes the steps of deploying the web application and automatically processing the web application using the dynamic code set to produce a performant web application based on the configuration parameters.

A method comprising a machine-readable medium is also provided. The machine-readable medium comprises at least one server and at least one client in communication with the server. Instructions are provided, which, when executed by a machine, cause the machine to render a web page on the client. The instructions include configuration parameters for use in rendering the web page, wherein the configuration parameters are formed of a first configuration parameter including at least one of combined resources, strategically placed resource tags, headers set to ensure cacheable resources, a GZip file, and minified resources, and a second configuration parameter including at least one of combined resources, strategically placed resource tags, headers set to ensure cacheable resources, a GZip file, and minified resources. A dynamic code set manages the execution of instructions and facilitates client and server runtime interaction so as to manage resources rendered to the web page.

The system and method described above, which form a framework for improving Ajax performance, improve efficiency of a network computer system and render a web page or generate a web page more quickly for an end user. Moreover, the system may operate automatically without user input.

BRIEF DESCRIPTION OF THE DRAWINGS

FIG. 10 is a chart illustrating one or more examples of configuration parameters for use with the framework of FIG. 1.

FIG. 11 is a chart illustrating one or more examples of configuration parameters in an example of the framework of FIG. 1.

FIG. 12 is a chart illustrating one or more examples of configuration parameters in an alternative example of the framework of FIG. 1.

DETAILED DESCRIPTION

Aspects of the present disclosure are generally directed to a server based framework for improving web page rendering performance, and in particular for improving Ajax performance. The framework may be a re-usable design for a software system or subsystem including one or more of support programs, code libraries, scripting language or other software which may cooperate together.

Figure 1:
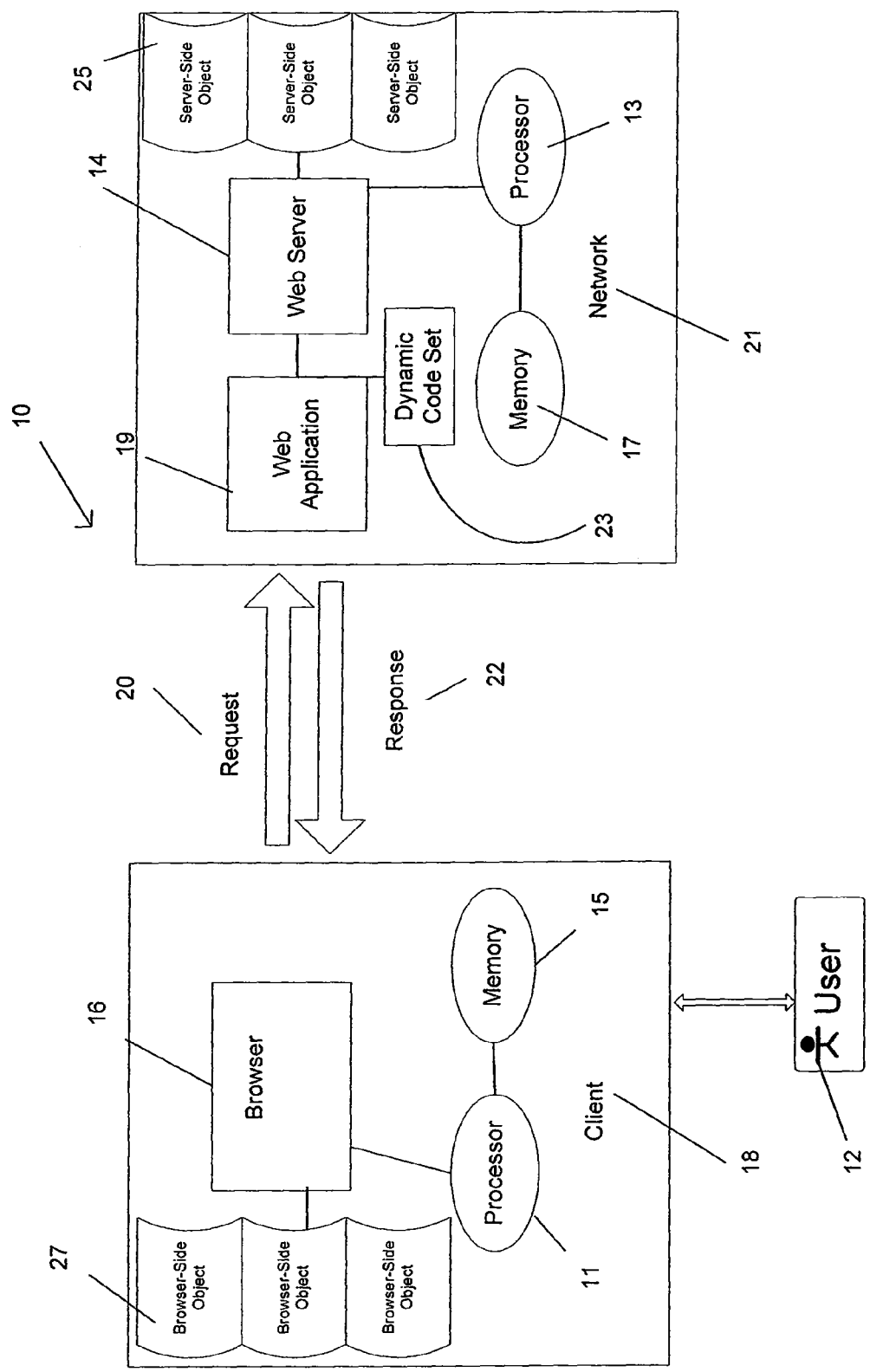
FIG. 1 is a flow diagram of the framework for improving Ajax performance, showing the general interaction of a client and a server.
Figure 2:
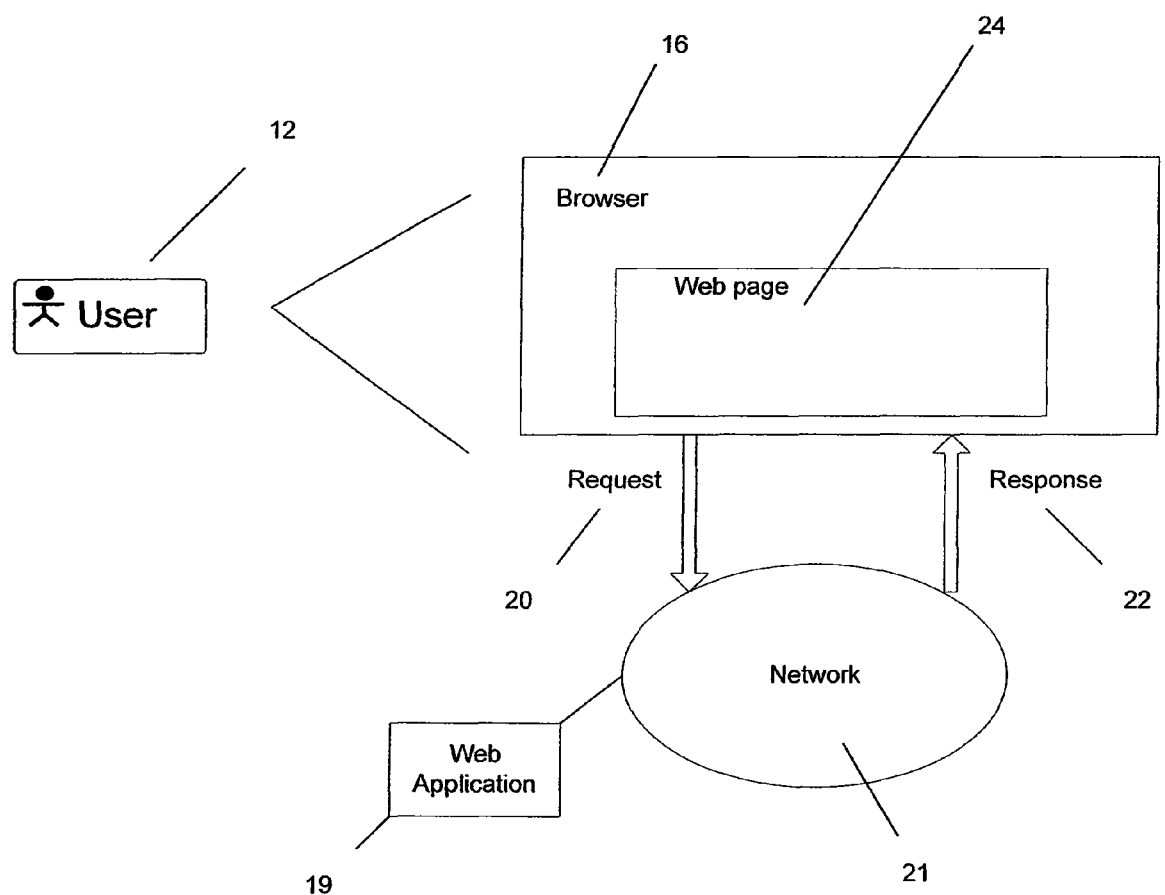
FIG. 2 is a flow diagram of the framework of FIG. 1, showing an example of the interaction between a browser and a network.

Generally, as can be seen by reference to FIGS. 1-2, in the system or framework 10 described herein, a web application environment is provided and includes a user device or client 18 for interacting with a user 12 having a connection to the Internet or other network for accessing a web server component 14. The system or framework 10 described herein generally includes a processor 11, 13, a memory 15, 17 coupled to the respective processors, a set of server-side objects 25, which may be data or instructions, to run on a server 14 which may be located on a network 21, and a set of browser-side objects 27, which may be data or instructions, of a browser 16 to run on a client 18. The user device or client 18 may employ the browser 16 for issuing requests 20, such as an HTTP request, to a web application 19 via a web server 14, and for receiving responses 22, such as an HTML response, from the web server 14. A response 22 may include dynamic and/or static content.

Figure 3:
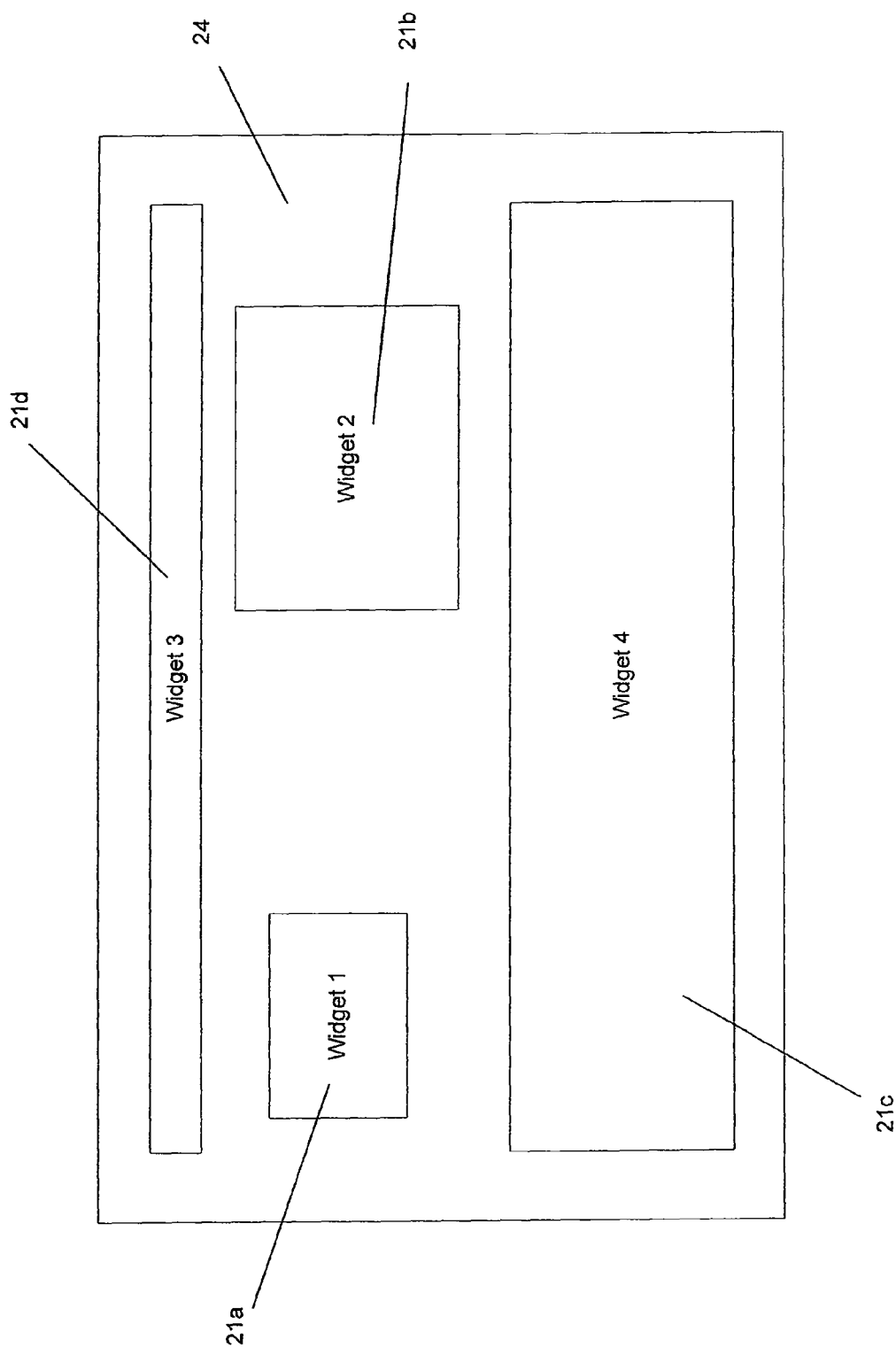
FIG. 3 is a block diagram of a web page for use in association with the framework of FIG. 1.

As indicated, in one or more examples of embodiments, the system is a computer system (see FIGS. 1 & 2) and includes the user device or client 18 which is a first computer that may include a processor 11, the first computer having a browser 16 or the like operable to access an Internet or Intranet application 19. For example, a web page 24 may be accessed by a user 12 by selecting the browser 16 and entering in an address for a particular website. A user 12 or Internet user may use any system or device which may be connectable to the Internet for access thereto, including, but not limited to personal computer, mobile phone, PDA, MP3 player, and the like. Generally, these devices include a graphical user interface (GUI) or a communication means by which web page content may be displayed or communicated. Thus, the user 12 accesses the Internet by this device and typically visits a website or web page. When a user 12 visits a particular website or web page, a user 12 essentially requests 20 a particular page, such as a homepage. The request 20 is provided to a web server 14 to render this page. The web server 14 may be a computer program responsible for accepting requests 20 from a client 18 and serving a response 22, which may include a web page, HTML document and linked objects. Alternatively, the web server 14 may be a computer running said program. The images scheduled for that page at that particular time and day may be rendered to the user 12 by a response 22 served to the client 18. The images or objects on a computer screen the user interacts with may be described as "widgets." FIG. 3 presents a general illustration of a hypothetical web page display having multiple widgets 21a, 21b, 21c, 21c. FIG. 3 is presented for purposes of illustration and understanding only, and one of skill in the art would understand that any suitable web page and arrangement of widgets may be acceptable for the purposes provided.

Figure 4:
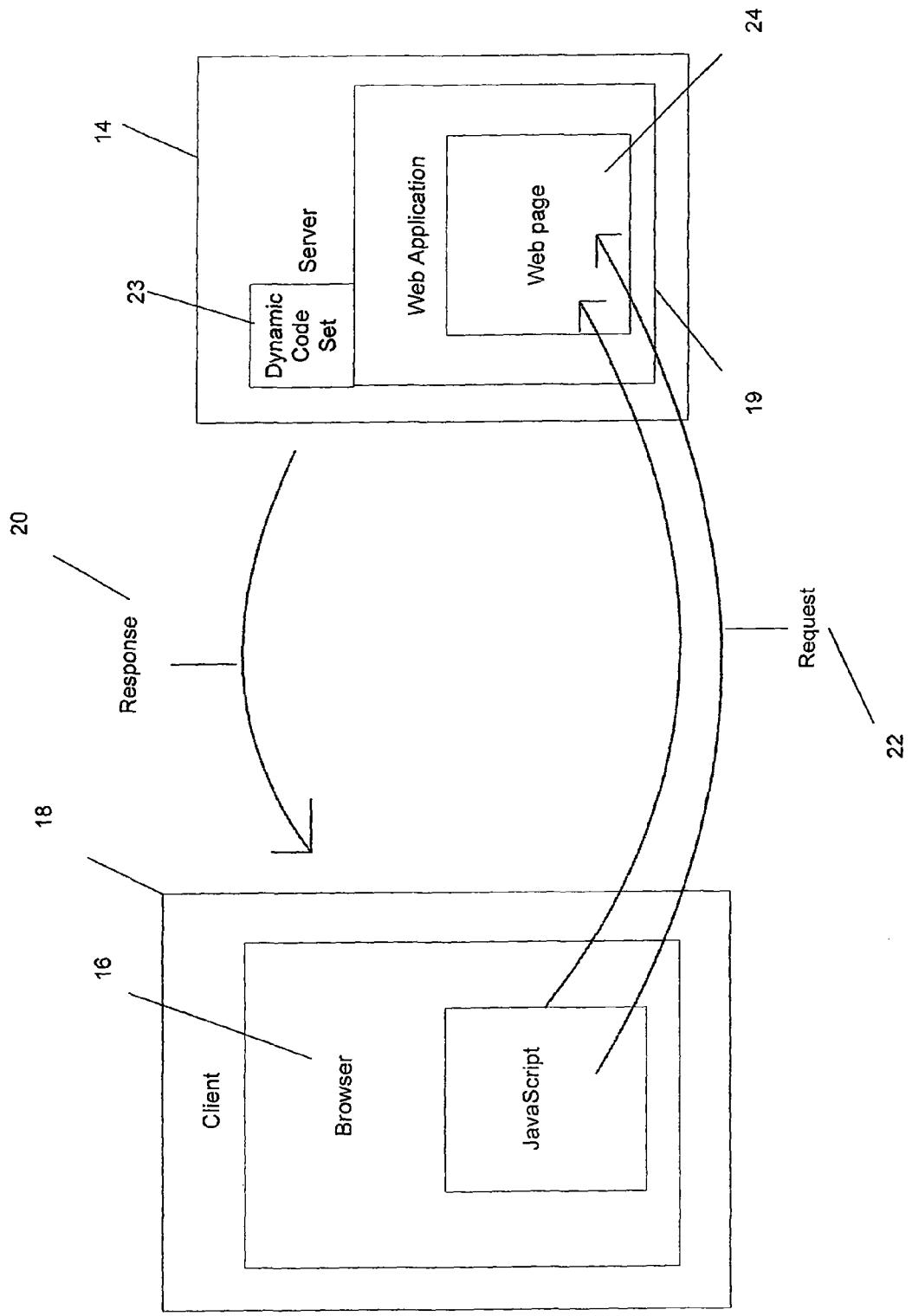
FIG. 4 is a flow diagram of the framework of FIG. 1, showing the use of JavaScript or PHP in one or more examples of the framework.

The content of the web page 24 and contact or access by a user 12 of the web page is generally managed by the web server 14. In one or more examples of embodiments of the system described herein, as shown in FIG. 4, a client computer 18 with a browser 16 is provided for calling upon the web application or web page 24. The web application 19 or browser 16 may execute JavaScript. The web server 14 may be in functional or operable communication with an additional server, such that it may exchange information or data with the additional server. The web server 14 may request information or content from the additional server to be displayed on the web page 24 in response to a user contact or selection on the web page. Alternatively, the browser 16 or web application, if not using JavaScript, may also request a page from the web server, then on receipt, may directly request one or more content pieces from the additional server such that communication of the content may be from or between the web page and additional server. The foregoing systems are generally referred to, respectively, as server-side serving and client-side serving. It is also possible that a server system may or may not be inside the web server.

Accordingly, the browser 16 provided in the client computer 18 provides a user interface that allows navigation of objects 25, 27 (FIG. 1). In one or more examples of embodiments, the browser 16 is a web browser, which may be a software application that enables a user 12 to display and interact with text, images, videos, music and other information typically located on a web page 24 at a website on the World Wide Web or a local area network. The browser 16 may also be used to access information provided by web servers in private networks or content in file systems. Text and images on a web page 24 may contain hyperlinks to other web pages at the same or a different website. The web page 24 may also include embedded images, animations, video, sound, and streaming media or may be accessible through the web page. To this end, the web browser 16 may allow a user 12 to quickly and easily access information provided on many web pages at many websites. The web browser 16 may also format information for display. The file format for a web page may be any suitable format, including, but not limited to HTML (hyper-text markup language), XML, as well as, for example JPEG, PNG and GIF image formats, and can be extended to support additional formats.

As indicated, the browser 16 may communicate with the server 14 (see FIGS. 1-2, 4). In one or more examples of embodiments, the web browser 16 may communicate with a web server 14 using any suitable language to fetch web pages, such as, for example, HTTP (hypertext transfer protocol), and may also use JavaScript or PHP to request or exchange data with the web server. Generally, web pages may be located by means of a URL (uniform resource locator). A variety of URL types and their corresponding protocols may be used, such as, but not limited to, HTTP, gopher (a hierarchical hyperlinking protocol), FTP (file transfer protocol), RTSP (real-time streaming protocol), and HTTPS (an SSL encrypted version of HTTP). While web browsers are specifically described, other applications may also be contemplated, such as but not limited to file browsers and code browsers. The server 14 may be the server associated with the website, namely, the server which returns the web page for rendering to the user 12. However, it is contemplated that the server 14 may be any suitable server capable of accomplishing the tasks described herein. To this end, the server may be an application server, communications server, database server, proxy server, fax server, file server, print server, game server, standalone server, web server, web feed server, client-server, X server, or catalog server.

JavaScript code may run locally in a user's or client's browser 16 and may be used to fetch web page data (as shown in FIG. 4). It may also run on a web server, taking the Java or PHP code as input and creating web pages as output. JavaScript may also be used in one or more websites to enable scripting access to objects embedded in other applications. In one or more examples of embodiments, as shown in FIG. 4, JavaScript or PHP dispatches a request 20 or requests for information (such as content) to the server 14. A JavaScript engine or JavaScript interpreter or JavaScript implementation may be provided in one or more examples of embodiments as an interpreter that interprets JavaScript source code received by the server 14 and executes the script accordingly. While JavaScript is specifically described, alternative scripting language may be used without departing from the overall scope of the present invention, including but not limited to ActionScript.

Ajax programming may be used for communication with the server 14. Ajax, or asynchronous JavaScript and XML, as is known, is a group of interrelated web development techniques used for creating interactive web applications or rich Internet applications. By use of Ajax, web application 19 may retrieve data from the server 14 asynchronously in the background without interfering with the display and behavior of an existing web page 24. Data may be generally retrieved using an "XMLHttpRequest" object or through the use of Remote Scripting in browsers that do not support "XMLHttpRequest". It is understood that the use of JavaScript, XML, or asynchronous use thereof is not required. Generally, any web technology that can be used to implement a web application that communicates with a server in the background without interfering with the current state of the page may be acceptable for use with the framework described herein. Examples include, but are not limited to, XHTML and CSS for presentation; the Document Object Model for dynamic display of and interaction with data; XML and ASLT for the interchange and manipulation of data respectively; the XMLHttpRequest object for asynchronous communication; and JavaScript. While XMLHttpRequest is specifically described, it is not necessary for asynchronous communication. For example, "IFrames" may also be capable of the same effect. Similarly, XML and XSLT are not required for data interchange or manipulation of data, respectively.

The framework 10 of one or more examples discussed herein may further include jMaki. jMaki is an Ajax framework providing a lightweight model for creating JavaScript centric Ajax-enabled web applications using Java, Ruby, PHP, and Phobos. More specifically, jMaki is a lightweight client/server framework for creating JavaScript centric Web 2.0 applications using CSS layouts, widgets, widget model, client services such as publish/subscribe events to tie widgets together, JavaScript action handlers, and a generic proxy to interact with external RESTful web services. jMaki generally abstracts JavaScript and CSS by providing defaults for widgets. Further, JavaScript widgets and CSS are made easily accessible so they may be customized by a designer or page developer. jMaki generally focuses on delivering JavaScript to the client, allowing the JavaScript to communicate to various server-technologies including PHP, Java (JSP/JSF), and Phobos in a server-technology neutral way.

Figure 5:
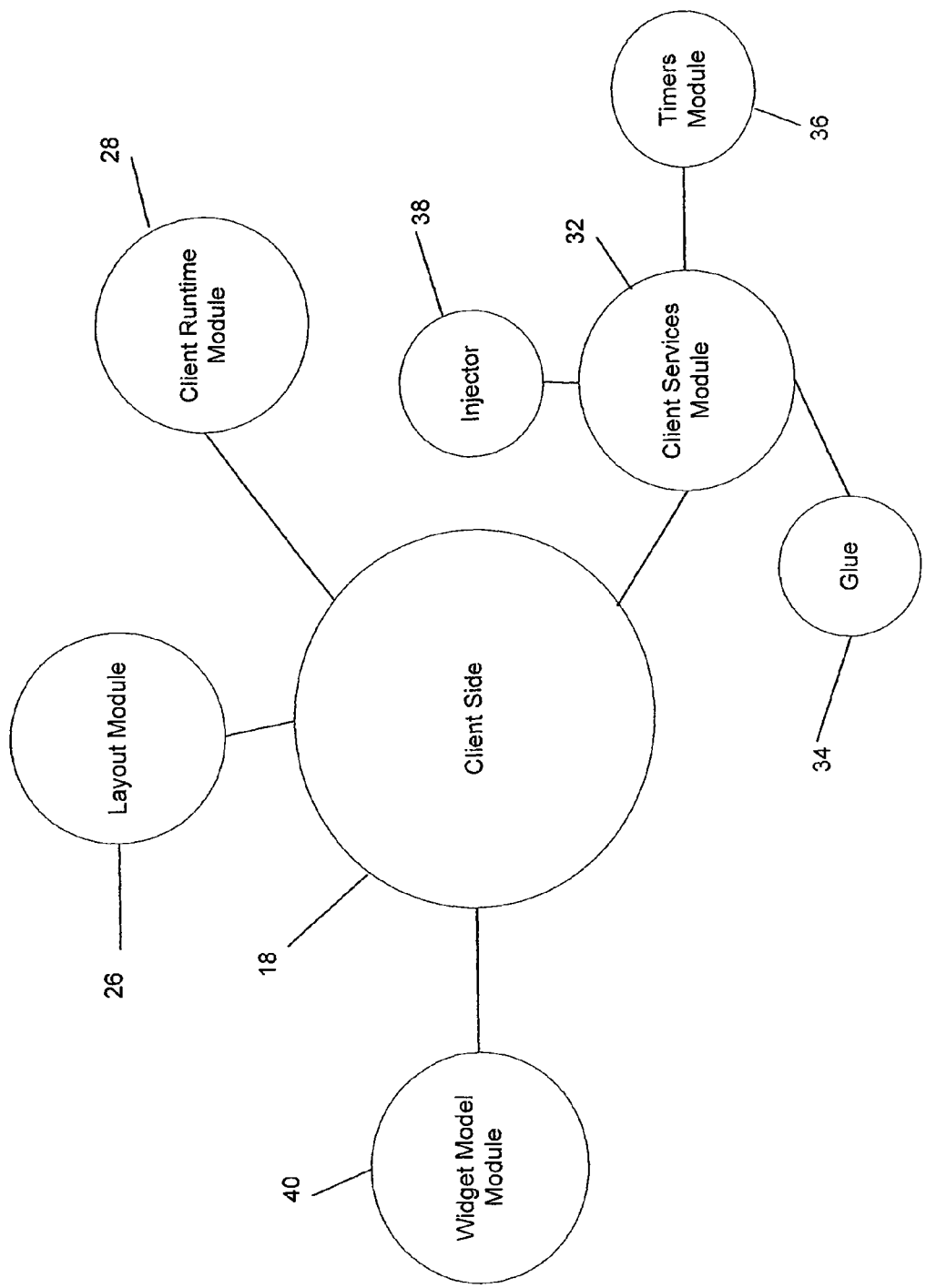
FIG. 5 is a modular diagram showing client side modules for use with the framework of FIG. 1.
Figure 6:
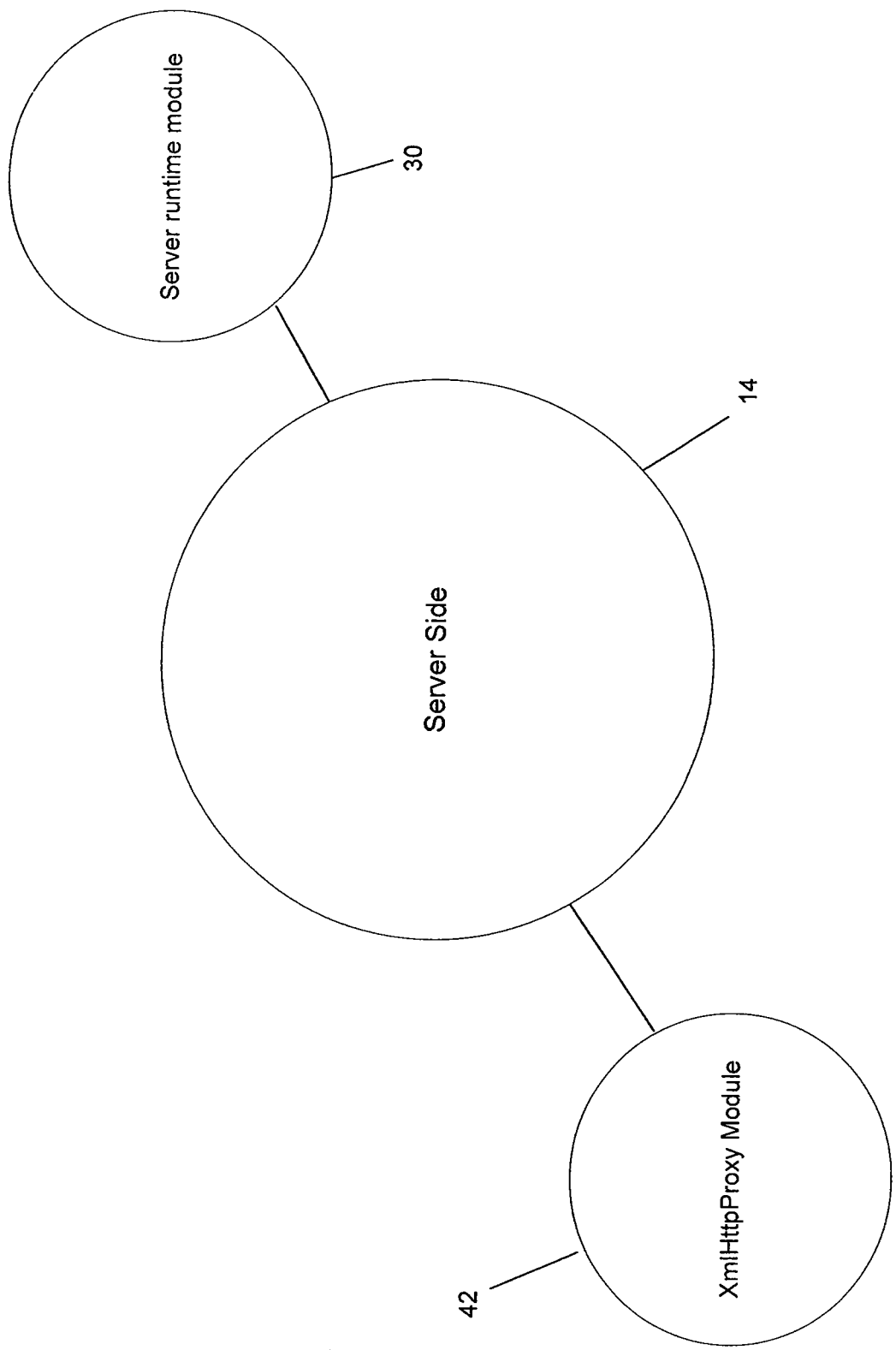
FIG. 6 is modular diagram showing server side modules for use with the framework of FIG. 1.
Figure 7:
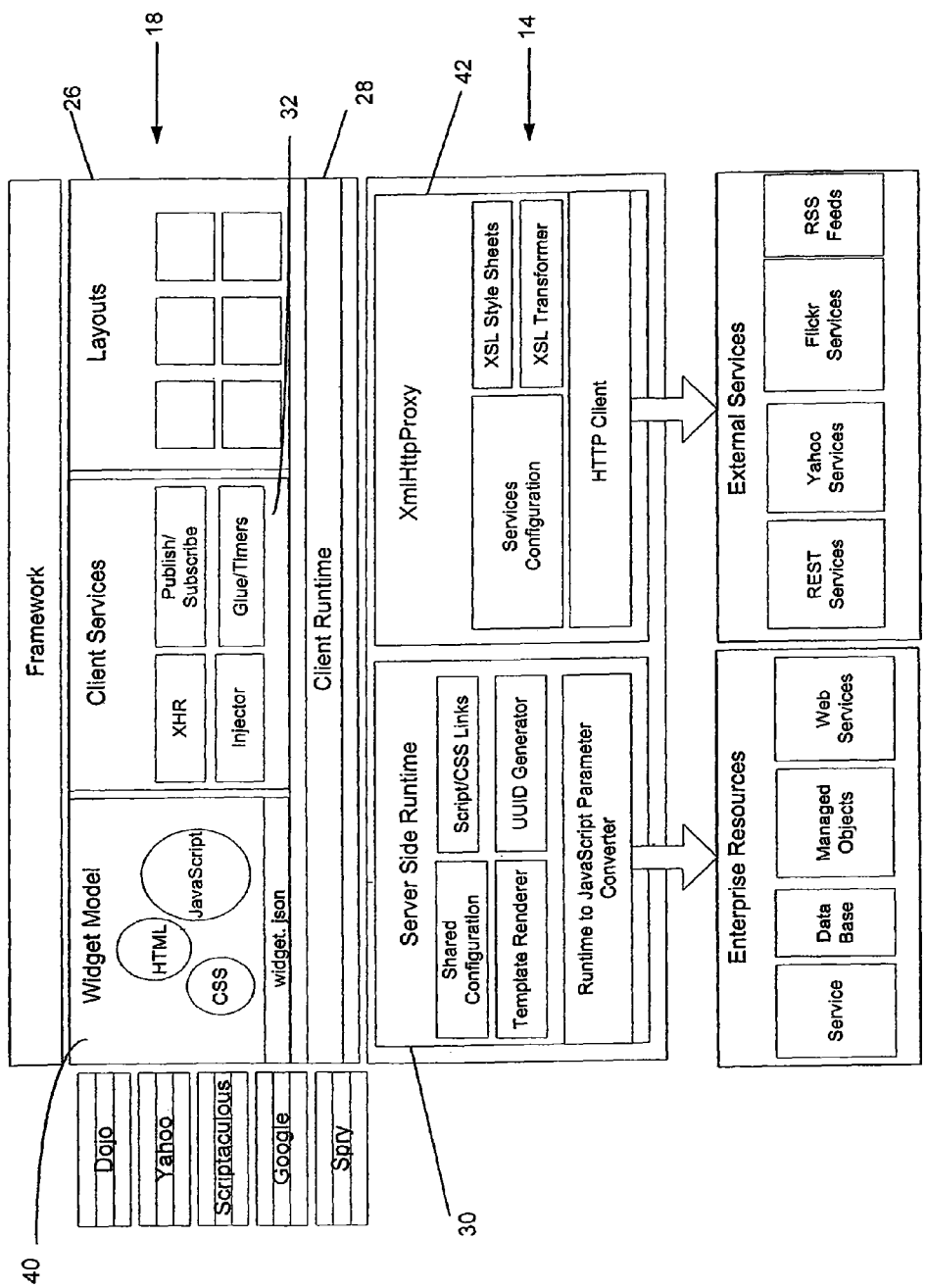
FIG. 7 is a chart illustrating one or more examples of a web application framework for use with the framework of FIG. 1.

Referring to FIGS. 5-7, a client side module 18 suitable for use with the present invention, and which may be characteristic of jMaki is described below. As shown in FIGS. 5 and 7, the client 18 may include a layout module 26 which provides a standards-based starting point for creating a web application 19 (FIG. 4) using HTML and CSS. In this module 26, the CSS may be in plain view so it can be easily customized for the specific needs. A client runtime module 28 may also be used. The client runtime module 28 may be, for example, the JavaScript responsible for bootstrapping all widgets (i.e., portable chunk of code which can be installed and executed within any separate HTML-based web page by an end user without requiring additional compilation), and passing parameters provided by a server-side runtime module 30 (see FIG. 6) to the widgets. In other words, the script may cause programs to be read and executed as part of a self-sustaining process that proceeds without external help. Parameters are unique to each widget, and the runtime module 28 makes sure that each widget instance obtains the correct parameters that were passed from a server side runtime module 30. In cases where parameters are not provided, runtime module 28 may use default parameters that may be customized for each widget. A client services module 32 may also be provided, such as but not limited to, APIs for performing "XMLHttpRequest" and publish/subscribe on the client 18 to widgets as a means of communication. "Glue" 34, for example jMaki Glue, may be built on top of the publish/subscribe mechanism and allows a user to define application behavior and tie widgets together with widgets using JavaScript actions when a specific event is published to a topic. A timers module 36 may be provided that allows JavaScript action handlers to be called or events to be published at a set interval. An injector 38 may be provided as a client service 32 that allows a user to bring in an external page into any given element. The injector 38 may transfer scripts and CSS to the global page content and allow widgets to be loaded much like an "IFrame". Finally, a widget model module 40 may be provided. The widget module 40 may be a component model for reusable JavaScript components having a structure based on HTML, JavaScript and CSS. This structure can be used to create widgets or wrap widgets from any given toolkit. Default wrappers and a server tie-in for many commonly-used widgets such as Dojo, Yahoo USI, Prototype, and some native widgets may be provided. Additionally, the client side 18 may define a "widget.json" format, so as to make the widget accessible by tools.

A server side module 14, or components suitable for use with the present system, and which may be characteristic of jMaki, are described below. Referring to FIGS. 6-7, a server module 14 is provided. The server module 14 may be responsible for tying the client runtime 28 to a server-side runtime 30 such as, but not limited to, Java, PHP, or the JavaScript-based Phobos runtime. The server-side runtime module 30 may track and render script and CSS references based on the library type being used, and may ensure that script and CSS links are not duplicated. The server-side runtime module 30 may also ensure API keys (such as, for example, Google and Yahoo Map keys) are applied when necessary based on a configurable set of keys. The server runtime 30 may render HTML templates, making and serializing data in JavaScript such that each side widget instance is provided the proper data. An XmlHttpProxy module 42 may also be provided. The XmlHttpProxy module 42 may provide a means for widgets to access JSON or XML, or to access RESTful XML-based services outside of the web application domain. Such services, shown as examples in FIG. 7, include but are not limited to, RSS feeds, Yahoo! services such as geo-coding, image searches, and so forth. The XmlHttpProxy module 42 may allow widgets to access services in a uniform way by providing XML-to-JSON transformations that can be easily customized.

In order to increase the speed of web pages or web page rendering, certain features or resources are desirable. For example, the number of HTTP requests 20 may be minimized. Reducing the number of components in a web page 24 (i.e., images, stylesheets, scripts, Flash, and the like) may reduce the number of HTTP requests required to render the page.

Furthermore, script, and in particular JavaScript and CSS, may be optionally externalized. That is, the respective code may be contained in external files rather than in-lined in the web page code. Generally, the use of external files may produce or render faster web pages because the JavaScript and CSS files, when retrieved, are then cached by the browser 16. In comparison, JavaScript and CSS in-lined in an HTML document may be downloaded every time the HTML document or web page is requested, slowing down performance. By externalizing, the size of the HTML document is reduced without increasing the number of HTTP requests 20. Accordingly, configuration parameters may be implemented in an application environment promoting a model where CSS and JavaScript resources are externalized, such as but not limited to jMaki. While the examples of embodiments described are suitable for use with and implemented with jMaki, alternatives would not depart from the overall scope of the present invention. Any application that promotes a model in which stylesheets and script resources are externalized may be suitable for the purposes provided.

Figure 8:
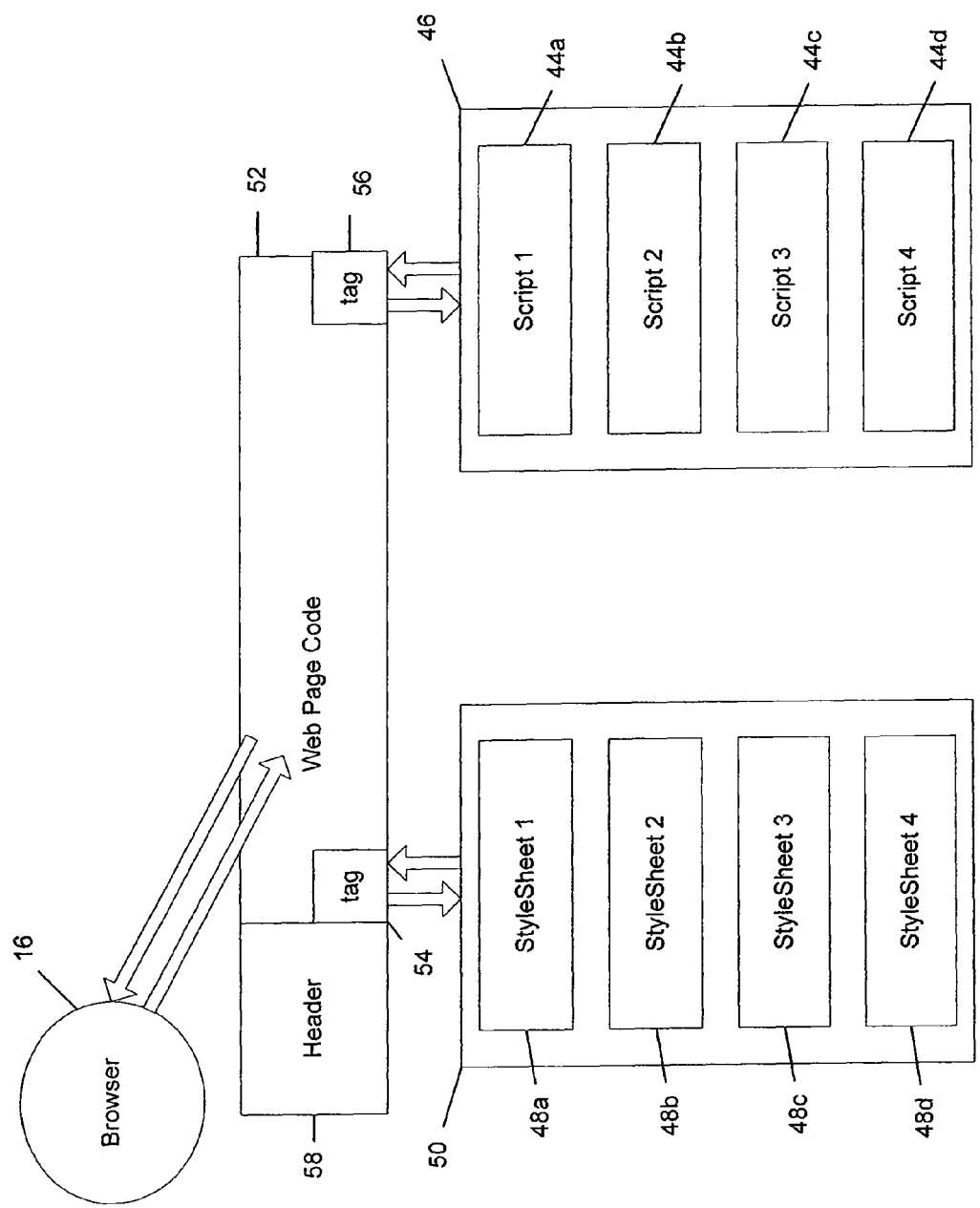
FIG. 8 is a flow diagram showing configuration parameters in one or more examples of the framework shown in FIG. 1, including a header, tags, combined scripts, and combined stylesheets.

In addition, in one or more examples of the framework 10 described herein, resources may optionally be combined such that the number of network calls are reduced. Referring to FIG. 8 to reduce the number of requests or network calls, a plurality of scripts (44a, 44b, 44c, 44d), which may be all scripts, may be combined into a single script 46 or file. Similarly, a plurality of CSS (48a, 48b, 48c, 48d), which may be all CSS, may be combined into a single stylesheet 50 or file. Accordingly, in the framework 10 provided herein, the codes, or a plurality of codes, such as but not limited to JavaScript or CSS codes, may be combined into one file. As a result, only one network call or request is required to obtain CSS or JavaScript code. Thus, the browser 16, in rendering a web page and reading the web page code 52, may only need to reach out one time and retrieve the combined script or stylesheet code 50 or 46. For example, widget names may be aggregated for a given page and used to generate MD5 (Message-Digit algorithm 5) hashes representing all the "component.css" or "component.js" files, which may be different hashes for each component file. In other words, a system is used to permit quick look-up of component files.

In the system described herein, the client or server runtime module 28 or 30 may look to see if a combined resource file has been generated and may create one if it does not exist. To this end, there may be one combined stylesheet file 50 and one combined script file 46 for all the widgets 21a-d (FIG. 3) in a given page, or alternatively, it is contemplated that one combined stylesheet and script file may exist. Furthermore, duplications or overlap may be reduced. That is, two or more pages containing the same set of widgets may only result in one combined resource. Further, the stylesheet resources for all widgets in a given page may be rendered at the correct time and respect the theming model which follows the standard stylesheet cascade.

Moreover, tags 54, 56 defining when such resources should be retrieved may be optionally strategically placed in web page code 52. "Tags" 54, 56 in a page or in the code may refer to or point to script or stylesheet code associated with specific widgets that will be rendered on a page and may be used to call upon externalized code. In the code 52 for a web page, the location of the tags for script code (56) (for example, JavaScript) and the stylesheet code (54) (for example, CSS) may be shifted to a specific location in the code such that browser 16 does not delay web page 24 rendering to retrieve the script or stylesheet code. For instance, a tag for CSS code 54 may be located in the HEAD or front or top, or more generally at the beginning of the web page code 52. In FIG. 8, the web page code 52 is illustrated in block form and read left to right, with the HEAD or front of the code, i.e., the header 58, being located on the left. Moving stylesheets (CSS) to the document HEAD or header 58 makes web pages appear to load faster, as the location in the HEAD allows the page to render progressively. In other words, the browser 16 displays whatever content as soon as possible. Furthermore, the scripts 46 or tag 56 therefore may be moved to the end or the bottom of the web page code 52 to allow a web page 24 to load faster.

In addition, to increase the speed of web pages or web page rendering, an "Expires" or a "Cache-Control" header 58 may be optionally added to the code. For example, with respect to static components, a "never expire" policy may be altered to set a far future "Expires" header; whereas with respect to dynamic components, an appropriate "Cache-Control" header may be used to help the browser 16 with conditional requests 20. The browser 16 may use a "cache" to reduce the number of HTTP requests 20, making web pages load faster. The web server 14 may use the Expires header in the HTTP response 22 to tell the client 18 operating the browser 16 how long a component can be cached. Thus, a far future Expires header may identify to the browser 16 that a response 22 is not to be stale for a long period of time. The header 58 may not be provided to the client 18 until a response 22 is provided to a request 20, in which case the header 58 may be particularly useful for subsequent page views. However, it is contemplated that one or more examples of embodiments may implement a header 58 as described for use with initial page views. As an example of implementation of the foregoing, a first-time visitor to the web page 24 may make several HTTP requests 20. By using the described cache—control header 58, such as the Expires header, the components (i.e., scripts, stylesheets, images, Flash, and the like) are cacheable, thereby avoiding unnecessary HTTP requests 20 on subsequent page views by the end user. The described headers 58 may be used on all components including, but not limited to, images, scripts, stylesheets, and Flash components. Accordingly, to manage the rendering of Ajax resources, headers 58 may be set, manipulated or otherwise used to ensure cacheable resources are correctly cached locally by the browser 16. While "header" and specific header types are described herein, any supplemental data placed at the beginning of a block of data being stored or transmitted (the payload or body) and used for similar purposes may be acceptable for use with the present invention.

Combined resources, such as script and stylesheet files 46, 50, and more particularly, JavaScript and CSS resource files, may be stored in memory (Java) or a file (PHP). These script and stylesheets may be stored for a maximum age ("max age") of the specified resource. The max age may be used as a basis for the cache-control headers 58, i.e., Expires header, which may also be written out manually or automatically. A typical default max age is twenty-four (24) hours. However, any suitable max age may be acceptable for the purposes provided. For instance, depending upon the frequency of file updates or other suitable factors, it may be appropriate to adjust the configuration of max age to a shorter duration or longer duration. In addition to, or as an alternative to max age, an Entity header may also be used. For example, an MD5 hash may be used as the entity header JavaScript or CSS resource file. The entity header may be sent by a client to the server to verify whether the resource the client has matches that contained on the server.

To enhance performance of web page 24 rendering, minified resources or code may also optionally be used. Code may be minified by removing all unnecessary characters from the code without changing its functionality. In other words, white space, new line characters, comments, block eliminates or unnecessary coding or information may be removed from the file to shrink the size of the file. For example, JavaScript, if available, may be minified for use/deployment so as to reduce the amount of data that needs to be transferred and increase the rate of transfer. Both external and in-lined code blocks may be minified. Many tools are available for minifying code, including but not limited to, Dojo ShrinkSafe, Dean Edwards Packer, and Yahoo! Compressor. Applications, including but not limited to jMaki applications, may be capable of automatically loading a minified component, namely, a minified "component-min.js" in place of "component.js" if the resource is provided. The minified resources may be also used in the combined script resource that is generated.

Figure 9:
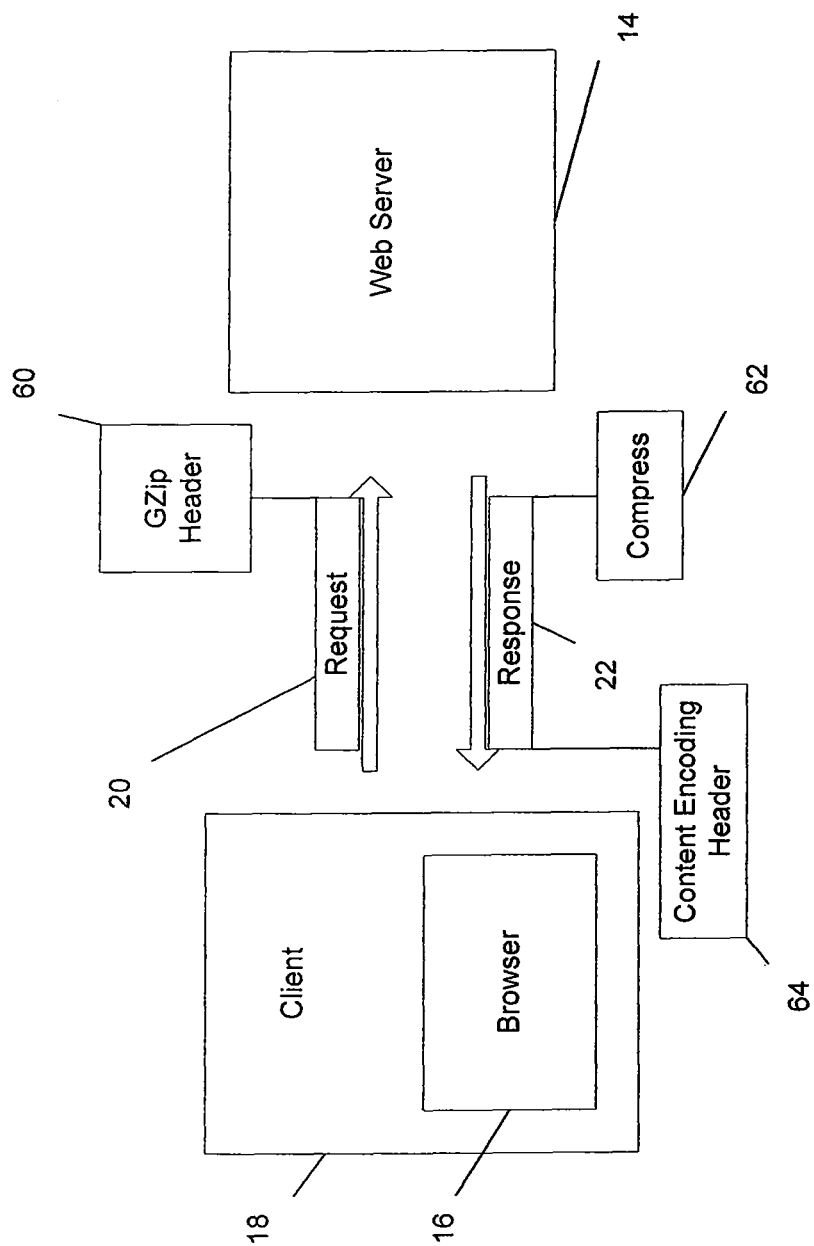
FIG. 9 is a flow diagram showing a configuration parameter in one or more examples of the framework shown in FIG. 1, including GZipped contents.

Compression reduces response time by reducing the size of the HTTP response 22. Accordingly, contents may be optionally GZipped (GNV zip); that is, the contents of a file may be GZipped for browsers that support it. For example, GZipping may reduce the response size in some instances by as much as 70% although any reduction in size may be acceptable for the purpose provided. Compressing or "zipping" a file improves the rate or ability to transfer the file. Further, GZipping as many files as possible may reduce page weight and accelerate page rendering for a user 12. A file may be GZipped based on deflate computer methods. Referring to FIG. 9, if a web server 14 sees a GZip header 60, such as for example, "Accept-Encoding: gzip, deflate", in the request 20, it may compress the response 22 using one of the methods listed by the client 18. The web server 14 may notify the web client 18 of this via a Content-Encoding header 64 in the response 22 (for example, "Content-Encoding: gzip"). In some browsers, such as INTERNET EXPLORER, if a file is "GZipped" when it comes across a browser 16, the browser will automatically know what to do with that file. In other words, no additional work is necessary on the client side. The client side 18 or browser 16 recognizes the file type and may be able to decompress or deflate the file (using GunZip) or use the file as appropriate. As a result, certain files can be GZipped for use with suitable browsers. An application of this resource may be used in an internal application, such as an Intranet, wherein a system only supports one suitable browser.

To improve web page load time, one or more of the foregoing steps or parameters, which parameters may constitute performance options, may be combined into a single automated step or a combination of automated steps in a code set 23 which dynamically process requests and constructs responses, such as a Servlet or computer code, such as but not limited to a function or set of functions 23 (see FIGS. 1, 2 and 4). In one or more examples provided herein, a plurality of configuration parameters, such as two or more parameters may be combined into a single dynamic code set. For example, a Servlet may be provided in the case of Java, while a function or function set or function code set may be provided for PHP. The rendering of Ajax resources has been generally modified in one or more ways by parameters set forth in a Servlet or function set. Any one or more of resources, properties or operating parameters, or more specifically codes or code segments, may be combined into one of the foregoing described code sets. The code set 23 may be arranged to receive a request and generate a response to the request. The parameters or code segments are combined into one piece of code that may handle all of the designated parameters or properties. The configuration parameters may be predefined parameters. To accomplish the foregoing, a set of properties or configuration parameters may be provided that can be set from a default to "true" or can otherwise be activated. While one or more parameters may be optionally included, all configuration parameters described herein may be included to increase the speed or performance of web page rendering.

The above-referenced configuration parameters may require client side runtime 28 and server side runtime 30 to perform (see FIGS. 5-7) because the parameters may be performed or accomplished before a page 24 is returned to the client 18. In one or more examples of embodiments, server side runtime 30 manages resources rendered to a page 24 while the client side runtime 28 is capable of rendering material an end user 12 may see on a web page 24. Accordingly, a suitable platform may include a client side runtime, and code, such as JavaScript code capable of rendering objects such as widgets, tables, trees or other material that an end user 12 may see on a web page. In the examples of one or more embodiments described herein, jMaki manages the rendering of Ajax resources, although alternative web applications may be acceptable for the purposes provided. For example, any suitable web technology or application which may include a server/client technology as described herein, or in which client and server runtime interact so as to manage the resources rendered to a page, may be acceptable for use.

Moreover, the suitable platform may include a server side component in which, for example, JSF or JSP or the like may be used to create the web page 24. A server side component may also be provided that reviews or reads a web page 24, or the elements on the page and which may be capable of translating tags 52, 54 or markers in the code 52 to retrieve particular code or files, such as a combined script file 46 or combined stylesheet file 50. For example, the server 14, upon encountering a certain string of code 52, 54, may be capable of replacing that string with replacement code 50, 46, such as JavaScript code and/or CSS code or the like, which code is retrieved from a file and which may be necessary to render a portion of the web page (see FIG. 8). The server side component may also include a tag library, which includes one or more predefined tags or code strings with a meaning or corresponding replacement code, associated therewith. The server side component may also perform additional tasks.

Accordingly, the foregoing presents a machine-readable medium including instructions, which, when executed by a machine, cause the machine to perform operations. The instructions in one or more examples of embodiments are configuration parameters managed by a computer and which are arranged to render a web page on an additional computer.

An application 19 is created, such as a jMaki application. In creating the application 19, one or more tags or flags 52, 54 are placed in tag libraries. In operation of one or more examples of embodiments, one or more tags may be set. In PHP, one or more properties are set and a directory on the file system may be created. In creating the application 19, a table of configuration parameters may be inserted in addition to or in connection with the tags. Any number of features or elements may be inserted without departing from the overall scope of the present invention.

A basic list of steps or configuration parameters for the web page 24 or for rendering the web page may be provided which can be turned on or off. For example, one such parameter may include "jMaki combined styles". The configuration parameters forming at least a portion of the framework for improving Ajax performance include a plurality of the above discussed resources. For example, as shown in FIG. 10, combined resources, headers set to ensure cacheable resources, storage of script and stylesheets, minified resources and GZipping of contents may be provided as configuration parameters 64. These parameters 64 may or may not be presented in a table. The configuration parameters 64 described in the example may be further combined with strategically placed resource tags, externalized script and stylesheets and other relevant parameters (not shown). In a typical web page, one or more of the configuration parameters may be "turned off" by default, and may therefore require an affirmative action to "turn on". In certain programming languages, this may be done by altering the word "false" to become "true", however any suitable mechanism or language for activating a configuration parameter may be acceptable for purposes of the present invention. Any one or more configuration parameters may be altered. It is also contemplated that default settings may not change.

Once parameters are set or configured in the dynamic code set 23 and any tags 52, 54 are placed, or strategically placed in the code, the file may be saved and the application 19 deployed. In the server based framework for improving Ajax performance, the system may manage a set of server-side objects 25 on the server 14 and may further cause the client 18 to run a set of browser-side objects 27 on a browser 16. In one or more examples of the operation of the system, the user 12 may be running a web page 24 on the client computer or user device 18. The user 12 requests 20 an application, for example, by selecting a hyperlink in the web page 24 or by entering a web page address. On the client side, the web page 24 operating in a user's browser 16 makes a request 20 for the information or data linked to the hyperlink. According to the operation of one or more examples, a web page 24 executing JavaScript, submits a request 20 to a server 14 (see FIGS. 1-4). On the server side, a response 22 is provided to the request 20 with the information for rendering on the web page 24 or for rendering a web page 24 on the client computer 18 for the user 12.

As indicated, the code automatically processes the web application 19 to produce a performant application or web application based on the configuration parameters. That is, the web application shows improved performance, increasing speed and efficiency of rendering. When an end user 12 accesses the web page 24 with the deployed application 19, the dynamic code set 23 is engaged or operates prior to return or rendering of the page for the client 18. Performance of web page 24 rendering may be enhanced by setting the configuration parameters as described above. The configuration parameters that are set define the actions for or invoked by the application 19. In the examples provided hereinabove, the configuration parameters may be set to reduce the number of network calls by combining CSS and/or JavaScript resources. Configuration parameters may be set to appropriate headers to ensure cacheable resources are correctly cached locally by browsers. Configuration parameters may be set to use minified code, such as JavaScript, if available. Configuration parameters may be set to GZip contents of files or use GZip contents for browsers that support GZip. Configuration parameters may be set by strategic placement of CSS and JavaScript tags. Any one or more of the forgoing configurations may be used alone or in any combination, or with additional parameters to improve the performance of web page rendering.

Setup of the system may be accomplished by one or more mechanisms. For ease of illustration, setup will be described in reference to jMaki, although other applications may be suitable for use. To setup the server based framework or system in PHP, a "cache" directory may be created in the same directory as, for example, "jMaki.php". Permissions on the cache directory may be set such that the process running PHP may write files to the cache directory. The "cache.php" and "jMaki.php" files may be located in the same directory. However, the use of separate directories may also be acceptable. To this end, it may be necessary to confirm the "cache.php" file is located in the same directory as the "jMaki.php" file. In one example, shown in FIG. 11, configuration of the parameters is accomplished by modifying variables that appear in the file, for example such variables may appear at the top of or in the "jMaki.php" file. The user 12 may optionally set one or more of the configuration parameters provided in FIG. 11. In the example provided in FIG. 11, activation or selection of parameters may be accomplished by changing "false" to "true". Further customization may be performed by modifying the "cache.php" which may manage cached content.

An application is created, such as a jMaki application. A dynamic code set 23 may be configured in the "web.xml" file to serve cached resources which are kept in memory. For example, a Servlet 23 may be included in the jMaki library as: "jmaki.runtime.CombinedResourcesServlet". Servlet 23 mapping may be added, such as "/cr". If Servlet 23 mapping other than "/cr" is used, it may be necessary to configure the runtime with a new location corresponding to the alternative Servlet mapping.

In Java (JSP/JSF), a Servlet 23 may be configured in a "web.xml" file to serve cached resources which are kept in memory. Again, the Servlet 23 may be included in the jMaki library as: "jmaki.runtime.CombinedResourcesServlet". In this example, Servlet mapping may be added as "/cache". Alternatively, if Servlet mapping other than the foregoing is used, it may be necessary to configure the runtime with a new location corresponding to the alternative Servlet mapping.

To enable combined resources in Java, configuration of the performance options may be done by modifying certain context parameters in the "web.xml" and as shown in FIG. 12. The cached content may be stored in the Servlet context and is flushed when an application is re-deployed. The user 12 may optionally set one or more of the configuration parameters.

The following is an example of a minimal set of parameters suitable for use in a "web.xml" in one or more examples of the present invention.

```
<context-param>
    <param-name>jmaki-combinescripts</param-name>
    <param-value>true</param-value>
</context-param>
<context-param>
    <param-name>jmaki-combinestyles</param-name>
    <param-value>true</param-value>
</context-param>
<servlet>
    <servlet-name>Combined Resource Servlet</servlet-name>
    <servlet-class>jmaki.runtime.CombinedResourceServlet</servlet-class>
    <load-on-startup>2</load-on-startup>
    </servlet>
<servlet-mapping>
    <servlet-name>Combined Resource Servlet</servlet-name>
    <url-pattern>/cr</url-pattern>
</servlet-mapping>
```

An example of a web application 19 is provided below. In the illustrated example, Netbeans may be used to create the web application. However, Eclipse or a plain editor or the like may also be used. In this example, a jMaki menu, tag cloud and blocklist widgets are included. However, any jMaki wrapped widgets or custom jMaki widgets that have been created may be used. The page looks as follows:

```
<%@ taglib prefix="a" uri="http://jmaki/v1.0/jsp" %>
<!DOCTYPE html PUBLIC "-//W3C//DTD XHTML 1.0 Transitional//EN"
"http://www.w3.org/TR/xhtml1/DTD/xhtml1-transitional.dtd">
<html>
    <head>
        <link rel="stylesheet" href="jmaki-2column-footer.css"
        type="text/css"></link>
        <title>Page Title</title>
        <meta http-equiv="Content-Type" content="text/html;
        charset=UTF-8" />
        <a:page>
    </head>
    <body>
        <div id="border">
            <div id="header">
                <div id="banner">Application Name</div>
                <div id="subheader">
                    <div>
<a:widget name="jmaki.menu"
    value="{menu : [
    {label: 'Links',
        menu: [
            { label : 'Sun.com',
             href : 'http://www.sun.com'},
            { label : 'jMaki.com',
             href : 'http://www.jmaki.com'}
        ]
    },
    {label: 'Actions',
        menu: [
            { label : 'Select',
```

-continued

```
             action :{topic: '/foo/select',
               message: { targetId : 'bar'}}
            },
            { label :'Set Content',
             action :{topic: '/foo/setContent',
               message: { value : 'test.jsp'}}
            }
        ]}
    ]
    }" />
                </div>
            </div> <!-- sub-header -->
        </div> <!-- header -->
        <div id="main">
            <div id="rightColumn" style="height:400px">
<a:widget name="jmaki.blockList" value="[
    {title : 'jMaki Project Home', link : 'https://ajax.dev.java.net',
description : 'Where to go for the latest jMaki.' },
    {title : 'jMaki Widgets Home', link : 'https://widgets.dev.java.net',
description : 'The source for the latest jMaki widgets.' },
    {title : 'jMaki-Charting Home', link :
'https://jmaki-charting.dev.java.net', description :
'Enables complex charts rendered on the client in any modern browser.' }
    ]" />
            </div> <!-- end leftColumn -->
            <div id="leftColumn" style="height:400px">
<a:widget name="jmaki.tagcloud" value="{
    items : [
        { label : 'jMaki', weight : 70},
        { label : 'Web2.0', weight : 150},
        { label : 'JSON', weight : 80},
        { label : 'JavaScript', weight : 145},
        { label : 'Java', weight : 100},
        { label : 'RSS', weight : 85},
        { label : 'Autocomplete', weight : 75},
        { label : 'Sun', weight : 65, href : 'http://www.sun.com'},
        { label : 'jMaki', weight : 150},
        { label : 'Web3.0', weight : 70},
        { label : 'Phobos', weight : 105},
        { label : 'Glassfish', weight : 120},
        { label : 'RSS2.0', weight : 75},
        { label : 'Web1.0', weight : 50},
        { label : 'JavaEE', weight : 75},
        { label : 'Jersey', weight : 115},
        { label : 'Roller', weight : 150},
        { label : 'CSS', weight : 105},
        { label : 'DHTML', weight : 65},
        { label : 'Netbeans', weight : 115, href : 'http://www.netbeans.com'}
    ]
}" />
            </div> <!-- leftColumn -->
        </div> <!-- main -->
        <div id="footer">Footer</div>
        </div> <!-- border -->
    </a:page>
    </body>
</html>
```

The forgoing example represents an illustrative example of a jMaki web page or application 19 with the addition of certain tags. Namely, the <a:page> tag at the beginning instructs the jMaki code where to drop or locate externalized CSS code, which may be located in the header. The closing </a:page> tag instructs jMaki where to drop or locate the externalized combined JavaScript code which may be the last line in the body. One further change to the illustrated jMaki page may be appropriate in the "web.xml" file. In particular, one or more properties or configuration parameters may be activated or set to "true", so as to configure the dynamic code set 23 that performs the work. For example, the following may be added to the "web.xml" file:

```
<context-param>
    <param-name>jmaki-combinescripts</param-name>
```

```
    <param-value>true</param-value>
</context-param>
<context-param>
    <param-name>jmaki-combinestyles</param-name>
    <param-value>true</param-value>
</context-param>
<servlet>
    <servlet-name>Combined Resource Servlet</servlet-name>
    <servlet-class>jmaki.runtime.CombinedResourceServlet</servlet-class>
    <load-on-startup>2</load-on-startup>
    </servlet>
<servlet-mapping>
    <servlet-name>Combined Resource Servlet</servlet-name>
    <url-pattern>/cr</url-pattern>
</servlet-mapping>
```

Aspects of the framework 10 described herein can be implemented on software running on a computer system. The system herein, therefore, may be operated by computer-executable instructions, such as program modules, executable on a computer. Program modules may include routines, programs, objects, components, data structures and the like which perform particular tasks or implement particular instructions. The software program may be operable for supporting the transfer of information within a network of trusted partner sites using artifacts.

The computers for use with the system and various components described herein may be programmable computers which may be special purpose computers or general purpose computers that execute the system according to the relevant instructions. The computer system can be an embedded system, a personal computer, notebook computer, server computer, mainframe, networked computer, handheld computer, personal digital assistant, workstation, and the like. Other computer system configurations may also be acceptable, including, cell phones, mobile devices, multiprocessor systems, microprocessor-based or programmable electronics, network PC's, minicomputers, and the like. Preferably, the computing system chosen includes a processor suitable in size to efficiently operate one or more of the various systems or functions.

The system or portions thereof may also be linked to a distributed computing environment, where tasks are performed by remote processing devices that are linked through a communications network. To this end, the system may be configured or linked to multiple computers in a network, including, but not limited to a local area network, a wide area network, a wireless network, and the Internet. Therefore, information and data may be transferred within the network or system by wireless means, by hardwire connection or combinations thereof.

The computer can also include a display, provision for data input and output, etc. Furthermore, the computer or computers may be operatively or functionally connected to one or more mass storage devices, such as, but not limited to a database. The memory storage can be volatile or non-volatile and can include removable storage media. The system may also include computer-readable media which may include any computer readable media or medium that may be used to carry or store desired program code that may be accessed by a computer. The invention can also be embodied as computer readable code on a computer readable medium. To this end, the computer readable medium may be any data storage device that can store data which can be thereafter read by a computer system. Examples of computer readable medium include read-only memory, random-access memory, CD-ROM, CD-R, CD-RW, magnetic tapes, and other optical data storage devices. The computer readable medium can also be distributed over a network coupled computer system so that the computer readable code is stored and executed in a distributed fashion.

The system deploying the foregoing framework for improving Ajax performance improves efficiency of a network computer system. The framework further renders a web page or generates web pages more quickly for an end user. For example, one application may present up to and including 30% improvement in page load time by simply setting the properties or configuration parameters described herein. Moreover, apart from making sure the dynamic code set is called before the page is handed back to the client, the dynamic code set operates automatically without user input as the process is managed by code.

Reference is made herein in detail to one or more examples of a server based framework for improving Ajax performance, examples of which are illustrated hereinabove and in the accompanying drawings.

Although various representative examples of embodiments of this invention have been described above with a certain degree of particularity, those skilled in the art could make numerous alterations to the disclosed embodiments without departing from the spirit or scope of the inventive subject matter set forth in the specification and claims. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Moreover, some portions of the detailed descriptions herein are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities. Unless specifically stated otherwise as apparent from the discussions herein, it is appreciated that throughout the present invention, discussions utilizing terms such as "receiving," "sending," "generating," "reading," "invoking," "selecting," and the like, refer to the action and processes of a computer system, or similar electronic computing device, including an embedded system, that manipulates and transforms data represented as physical (electronic) quantities within the computer system.

Although the present invention has been described with reference to particular embodiments, persons skilled in the art will recognize that changes may be made in form and detail without departing from the spirit and scope of the invention.

What is claimed is:

1. A system for rendering a web page comprising:
a dynamic code set for processing a web page to decrease a load-time of the web page without user input by setting selectively activated performance option, parameters included within the dynamic code set prior to rendering the web page, wherein the selectively activated performance option parameters are formed of a first selectively activated configuration parameter and a second selectively activated configuration parameter, the first selectively activated configuration parameter includes at least one of combined resources, strategically placed resource tags, headers set to ensure cacheable resources, a GZip file, and minified resources, and the second selectively activated configuration parameter includes at least one of combined resources comprising a single script executed during the rendering of at least a portion of the web page, wherein the single script is generated by combining each script of a plurality of scripts into the single script and wherein the single script requires a single network call to access the single script, strategically placed resource tags, headers set to ensure cacheable resources, a GZip file, and minified resources; and
a server adapted to communicate with a client, the client operating a browser in communication with the server and arranged to render material to the browser that the user may view on the web page.

2. The system of claim 1, wherein the dynamic code set is a Servlet and wherein the single script is JavaScript code.

3. The system of claim 1, wherein the dynamic code set is a function code set.

4. The system of claim 1 wherein a single dynamic code set is provided.

5. The system of claim 1 wherein a web application is provided and includes the dynamic code set.

6. The system of claim 5, wherein the web application is jMaki.

7. The system of claim 1, wherein the dynamic code set is configured to serve cached resources which are kept in memory.

8. The system of claim 1, wherein the combined resources are set to reduce a number of network calls by combining at least one of CSS and JavaScript resources.

9. The system of claim 1, wherein the performance option parameters include headers set to ensure cacheable resources are cached locally by the browser.

10. The system of claim 1, wherein the strategically placed resource tags include strategic placement of CSS and JavaScript tags.

11. A method comprising:
creating a web application for rendering a web page on a client, the application having a client side and a server side;
setting, in a dynamic code set for processing the web page to decrease a load time of the web page without user input, selectively activated performance option parameters included within the dynamic code set prior to rendering the web page, wherein the selectively activated performance option parameters are formed of a first configuration parameter including at least one selectively activated configuration parameter of combined resources comprising a single script executed during the rendering of at least a portion of the web page, wherein the single script is generated by combining each script of a plurality of scripts into the single script and wherein the single script requires a single network call to access the single script, strategically placed resource tags, headers set to ensure cacheable resources, a GZip file, and minified resources, and a second selectively activated configuration parameter including at least one of combined resources, strategically placed resource tags, headers set to ensure cacheable resources, a GZip file, and minified resources;
deploying the web application; and
automatically processing the web application using the dynamic code set to produce a performant web application.

12. The method of claim 11, wherein when an end user accesses the web page with the deployed application, the step of automatically processing the web application includes engaging the dynamic code set including the first configuration parameter and the second configuration parameter prior to rendering of the web page for the end user.

13. The method of claim 11, wherein the performance option parameters are set to reduce a number of network calls by combining CSS and JavaScript resources.

14. The method of claim 11, wherein the performance option parameters are set to headers which ensure cacheable resources are cached locally by a browser.

15. The method of claim 11, wherein the performance option parameters are set to use minified code.

16. The method of claim 11, wherein the performance option parameters are set to use GZip contents of files.

17. The method of claim 11, wherein the performance option parameters are set by strategic placement of CSS and JavaScript tags.

18. A non-transitory machine-readable medium comprising:
at least one server and at least one client in communication with the server;
instructions, which, when executed by a machine, cause the machine to render a web page on the client, the instructions including processing the web page to increase a load-time of the web page without user input by setting selectively activated performance option parameters prior to rendering the web page wherein the selectively activated the performance option parameters are formed of a first selectively activated configuration parameter including at least one of combined resource comprising a single script executed during the rendering of at least a portion of the web paqe, wherein the single script is generated by combining each script of a plurality of scripts into the single script and wherein the single script requires a single network call to access the single script, strategically placed resource tags, headers set to ensure cacheable resources, a GZip file, and minified resources, and a second selectively activated configuration parameter including at least one of combined resources, strategically placed resource tags, headers set to ensure cacheable resources, a GZip file, and minified resources; and
a dynamic code set code set managing the execution of instructions and facilitating client and server runtime interaction so as to manage resources rendered to the web page.

19. The machine-readable medium of claim 18, wherein the dynamic code set includes and manages activation of the configuration parameters.

* * * * *